3,068,278
CARBAMATES OF 2 PHENYLSULFONYL
ETHANOLS
Jack Bernstein, New Brunswick, and Ervin R. Spitzmiller, Highland Park, N.J., assignors to Olin Mathieson Chemical Corporation, New York, N. Y., a corporation of Virginia
No Drawing. Filed Aug. 25, 1961, Ser. No. 133,763
6 Claims. (Cl. 260—482)

This invention relates to new carbamic acid esters and more particularly to the carbamates of 2-arylsulfonylethanols.

The compounds of this invention may be represented by the general formula

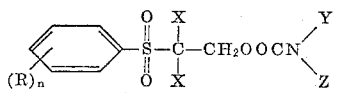

wherein R is selected from the group consisting of hydrogen, lower alkyl, lower alkoxy, halogen and trifluoromethyl, $n$ is a positive integer less than four, the X's are the same or different and are selected from the group consisting of hydrogen, halogen and lower alkyl, provided if one X is halogen, the other X must be halogen, Y and Z are each selected from the group consisting of hydrogen and lower alkyl, or together with the nitrogen to which they are joined, Y and Z are a basic saturated 5 to 6 membered N-heterocyclic radical of less than twelve carbon atoms, as exemplified by piperidino, (lower alkyl) piperidino [e.g., 2,3, or 4-(lower alkyl)piperidino]; di(lower alkyl)piperidino [e.g., 2,4-, 2,5-, or 3,5-di(lower alkyl)piperidino]; (lower alkoxy)piperidino; pyrrolidino; (lower alkyl)pyrrolidino; di(lower alkyl)pyrrolidino; (lower alkoxy)pyrrolidino; morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl)piperazino (e.g., $N^4$-methylpiperazino); di(lower alkyl)piperazino; (lower alkoxy)piperazino; (hydroxy-lower alkyl)piperazino [e.g., $N^4$-(2-hydroxyethyl)piperazino]; (lower alkanoyloxyalkyl)piperazyl [e.g., $N^4$-(2-acetoxyethyl)piperazino]; (hydroxy-lower alkoxy, lower alkyl)piperazino [e.g., $N^4$-(2-hydroxyethoxyethyl)-piperazino]; and (carbo-lower alkoxy)piperazino [e.g. $N^4$-(2-carbomethoxy, carboethoxy, or carbopropoxy)piperazino].

The compounds of this invention possess spinal cord depressant activity and thus may be used as muscle relaxants for spastic conditions or as sedatives. For such purposes they are formulated in tablets, capsules or elixirs and are administered perorally.

The compounds of this invention are prepared by the process of this invention which comprises interacting a 2-arylsulfonylethanol of the formula

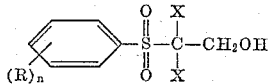

wherein R, $n$ and X are as hereinbefore defined, with phosgene, preferably in the presence of an acid acceptor base, such as triethylamine or antipyrine; and treating the product formed with a compound of the formula

wherein Y and Z are as hereinbefore defined, such as aqueous or liquid ammonia; a mono(lower alkyl)amine, such as methylamine, ethylamine and hexylamine, a di(lower alkyl)amine, such as dimethylamine, diethylamine and dibutylamine, or a 5 to 6 membered N-heterocyclic radical of less than twelve carbon atoms, such as piperidine, (lower alkyl)piperidine, di(lower alkyl)piperidine, (lower alkoxy)piperidine, pyrrolidine, (lower alkyl)pyrrolidine, di(lower alkyl)pyrrolidine, (lower alkoxy)pyrrolidine, morpholine, (lower alkyl)morpholine, di(lower alkyl)morpholine, (lower alkoxy)morpholine, thiamorpholine, (lower alkyl)thiamorpholine, di(lower alkyl)thiamorpholine, (lower alkoxy)thiamorpholine, piperazine, (lower alkyl)piperazine, di(lower alkyl)piperazine, (lower alkoxy)piperazine, (hydroxy-lower alkyl)piperazine, (lower alkanoyloxyalkyl)piperazine, (hydroxy-lower alkoxy-lower alkyl)piperazine, and (carbolower alkoxy)piperazine. If a substituted carbamate is the desired product, it can also be formed directly by interacting the free alcohol with the desired carbamyl halide or isocyanate, the reaction preferably being conducted at an elevated temperature.

In those instances where the 2-arylsulfonylethanol reactant is a new compound it can be prepared by a number of different methods. In accordance with one of such methods, if a dihalo (both X's are halo) compound is desired, a compound of the formula

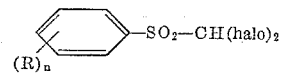

where R and $n$ are as hereinbefore defined, is interacted with formaldehyde, preferably in the presence of a basic catalyst, such as an alkali metal carbonate (e.g., sodium bicarbonate) to yield the corresponding 2-arylsulfonylethanol.

The 2-arylsulfonylethanol reactants can also be prepared by interacting an alkali metal (e.g., sodium) $(R)_n$-substituted benzenesulfinate with an α-halo(lower alkanoate), such as lower alkyl (e.g., methyl and ethyl) ester of α-bromoacetate, α-chloroacetate, α-iodoacetate, α-bromopropionate, α-bromobutyrate, α-bromovalerate, α-bromohexanoate and α-bromoenanthate, the reaction preferably being conducted at an elevated temperature, whereby a compound of the formula

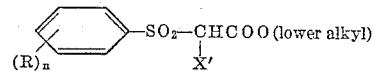

wherein R and $n$ are as hereinbefore defined and X' is hydrogen or lower alkyl, is formed. If a second lower alkyl substituent is desired, the ester is then reacted with a lower alkyl halide (e.g., methyl iodide, ethyl iodide, propyl iodide, n-butyl iodide and n-hexyl iodide, in the presence of a basic condensing agent such as sodamide or sodium hydride to introduce a lower alkyl group in the α-position. The ester is then reduced, as by treatment with lithium aluminum hydride, to yield the corresponding ethanol derivative.

Among the suitable 2-arylsulfonylethanol reactants may be mentioned: 2-(phenylsulfonyl)ethanol; 2-[(lower alkyl)phenylsulfonyl]ethanols, such as 2-(o-tolylsulfonyl)-ethanol, 2-(p-tolylsulfonyl)ethanol, 2-(o,p-xylylsulfonyl)-ethanol, and 2-(p-ethylphenylsulfonyl)ethanol; 2-[(lower alkoxy)phenylsulfonyl]ethanols, such as 2-(p-methoxyphenylsulfonyl)ethanol, 2-(o,p-dimethoxyphenylsulfonyl)ethanol, 2-(o-ethoxyphenylsulfonyl)ethanol, and 2-(p-isopropoxyphenylsulfonyl)ethanol; 2-(halophenylsulfonyl)ethanols, such as 2-(p-chlorophenylsulfonyl)-ethanol, 2-(p-fluorophenylsulfonyl)ethanol, and 2-(o,p-dibromophenylsulfonyl)ethanol; 2-(trifluoromethylphenylsulfonyl)ethanols, such as 2-(p-trifluoromethylphenylsulfonl)ethanol; 2-(phenylsulfonyl)-2-(lower alkyl)-ethanols, such as 2-(phenylsulfonyl)propanol, 2-(phenylsulfonyl)butanol, 2-(phenylsulfonyl)pentanol and 2-phenylsulfonyl)hexanol; and the aromatically substituted lower alkyl, lower alkoxy, halo and trifluoromethyl derivatives thereof; 2-(phenylsulfonyl)-2,2-di(lower alkyl)-ethanols, such as 2-(phenylsulfonyl)-2-methylpropanol, 2-(phenylsulfonyl)-2-ethylpropanol, 2-(phenylsulfonyl)-2-methylpentanol and 2-(phenylsulfonyl)-2-ethylhexanol; and the aromatically substituted lower alkyl, lower alkoxy, halo and trifluoromethyl derivatives thereof; 2-(phenylsulfonyl)-2,2-dihaloethanols, such as 2-(phenylsulfonyl)-2,2-dichloroethanol and 2-(phenylsulfonyl)-2,2-dibromoethanol; and the aromatically substituted lower alkyl, lower alkoxy, halo and trifluoromethyl derivatives thereof.

The process of this invention is illustrated by the following examples (all temperatures being in centigrade):

EXAMPLE 1

2-(Phenylsulfonyl)Ethyl Carbamate

A solution of 30 g. of 2-(phenylsulfonyl)ethanol and 16 g. of triethylamine in 300 ml. of anhydrous toluene is added dropwise with stirring to a solution of 16 g. of phosgene in 200 ml. of toluene at 10°. After the addition, the reaction mixture is allowed to stand overnight at room temperature. The triethylamine hydrochloride salt is filtered. The filtrate is saturated with ammonia at 5° C. and is allowed to stand at room temperature for 16 hours. The solid is filtered, washed with water and then recrystallized from acetonitrile to give about 14.5 g. (40%) of material melting between 146–148°.

EXAMPLE 2

2-(Phenylsulfonyl)Ethyl Dimethylcarbomate

Following the procedure of Example 1, but substituting 25 g. of dimethylamine for the ammonia, 2-(phenylsulfonyl)ethyl dimethylcarbamate is obtained.

EXAMPLE 3

2-(Phenylsulfonyl)Ethyl Ethylcarbamate

Following the procedure of Example 1, but substituting 25 g. of ethylamine for the ammonia, 2-(phenylsulfonyl)-ethyl ethylcarbamate is obtained.

EXAMPLE 4

2,2-Dichloro-2-(Phenylsulfonyl)Ethyl Carbamate (A) PREPARATION OF 2,2-DICHLORO-2-(PHENYLSULFONYL)-ETHANOL A solution of 20 g. of dichloromethylphenylsulfone, 14 g. of 37% formaldehyde and 0.6 g. of sodium bicarbonate in 80 ml. of 95% ethanol is stirred at 25° for twenty minutes. The reaction temperature is then raised to 35° for two hours and filtered. The filtrate is concentrated in vacuo to 25 ml. The crude product is extracted with 150 ml. of ether and the extract dried over magnesium sulfate. The ether extract is filtered and the ether removed. The residue is fractionated under reduced pressure to give about 10 g. (46%) of material distilling between 142–146° at 0.5 mm.

(B) PREPARATION OF 2,2-DICHLORO-2-(PHENYLSULFONYL)ETHYL CARBAMATE

A solution of 10 g. of 2,2-dichloro-2-(phenylsulfonyl) ethanol, and 4 g. of triethylamine in 50 ml. of toluene is added dropwise with stirring at 15° to a solution of 4 g. of phosgene in 100 ml. of toluene. After the addition the reaction mixture is stirred at room temperature for 8 hours. After removing the triethylamine hydrochloride by filtration, the filtrate is saturated with gaseous ammonia. The solvent is washed with water and dried over magnesium sulfate.

Upon filtration the solvent is removed by distillation under reduced pressure. The residue is recrystallized from an isopropyl ether-hexane mixture to give about 2.1 g. of material melting between 103–105°.

EXAMPLE 5

2,2-Dichloro-2-(p-Chlorophenylsulfonyl)Ethyl Carbamate (A) PREPARATION OF 2,2-DICHLORO-2-(p-CHLOROPHENYLSULFONYL)-ETHANOL A vigorously stirred suspension of 30 g. of p-chlorophenyl dichloromethyl sulfone in 180 ml. of 95% ethanol is treated with 20 g. of 37% formaldehyde and 800 mg. of sodium bicarbonate. After one-half hour the temperature is raised to 40° and kept there for 2½ hours. The solution is filtered and concentrated in vacuo to about 30 ml. This residue is poured into several volumes of ice-water. The product is filtered, dried and recrystallized from 350 ml. of cyclohexane to give about 20 g. (60%) of material melting between 81–83°.

(B) PREPARATION OF 2,2-DICHLORO-2-(p-CHLOROPHENYLSULFONYL)-ETHYL CARBAMATE

To a solution of 7.9 g. of phosgene in 100 ml. of toluene plus 150 ml. of anhydrous ether is added with stirring at 0°, a solution of 20 g. of 2,2-dichloro-2-(p-chlorophenylsulfonyl)ethanol and 7.4 g. of triethylamine in 200 ml. of ether. After the addition the mixture is stirred for two hours and allowed to rise to room temperature. After standing over-night, the mixture is cooled to 0° and treated with 50 ml. of concentrated aqueous ammonia. After stirring for 2 hours, the upper layer is separated, washed with water and dried. The ether is distilled off and the residue diluted with several volumes of hexane. The product which crystallizes from the solution is collected and is recrystallized from 80 ml. of toluene to give about 6.5 g. of material which melts between 138–140°.

EXAMPLE 6

2-Methyl-2-(Phenylsulfonyl)Amyl Carbamate (A) PREPARATION OF ETHYL 2-(PHENYLSULFONYL) PROPIONATE A mixture of 20 g. of sodium benzenesulfinate, 22 g. ethyl α-bromopropionate, 1 g. of sodium iodide and 500 ml. of absolute ethanol is stirred and refluxed for 10 hours. The mixture is filtered and the filtrate concentrated in vacuo until the alcohol is removed. The residue is diluted with ether and filtered to remove sodium bromide. The ether is distilled off and the residue is fractionated in vacuo to give about 24 g. (82%) of material boiling between 142–145° at 0.2 mm.

(B) PREPARATION OF ETHYL 2-METHYL-2-(PHENYLSULFONYL)-VALERATE

Twenty-four grams of ethyl 2-(phenylsulfonyl)propionate in 150 ml. of Diglyme is added to a suspension of 4.2 g. of sodamide in 150 ml. of Diglyme. The mixture is stirred without external heat for 10 minutes, then is heated on the steam-bath for 20 minutes. The solution is then cooled to 30° and 21 g. of propyl iodide added with stirring. The mixture is then heated at 120° for 4 hours. After standing over-night, the bulk of the Diglyme is removed on the steam-bath in vacuo. The residue is cooled and diluted with several volumes of chloroform. The sodium iodide is filtered off and the filtrate is washed with 3×100 ml. portions of water. The organic layer is dried over magnesium sulfate. After filtration the chloroform is distilled off and the residue fractionated under reduced pressure to give about 10 g. of material boiling between 150–155° at 0.2 mm.

(C) PREPARATION OF 2-METHYL-2-(PHENYLSULFONYL)-1-PENTANOL

To a stirred suspension of 1.5 g. of lithium aluminum hydride in 100 ml. of anhydrous ether is added dropwise a solution of 15 g. of ethyl 2-(phenylsulfonyl)valerate in 100 ml. of ether. After stirring at room temperature for three hours, the mixture is cooled and cautiously treated dropwise with 100 ml. of water, followed by a solution of 1 g. of sodium hydroxide in 5 ml. of water. The mixture is stirred for twenty minutes and extracted with ether. The ether is removed and the residue distilled to give about 6 g. of material boiling between 151–156° at 0.5 mm.

(D) PREPARATION OF 2-METHYL-2(PHENYL-SULFONYL)AMYL CARBAMATE

To a solution of 3 g. of phosgene in 35 ml. of toluene and 100 ml. of anhydrous ether is added with stirring at 0° 6 g. of 2-methyl-2-(phenylsulfonyl)-1-pentanol and 2.6 g. of triethylamine in 100 ml. of ether.

After the addition, the mixture is allowed to stand at room temperature for 24 hours. The mixture is filtered and the filtrate is cooled to 0° and saturated with gaseous ammonia. The mixture is filtered and the solvents removed under reduced pressure. The residue is recrystallized from benzene to give about 3.5 g. of material melting between 120° and 122°.

EXAMPLE 7

*2-Methyl-2-(Phenylsulfonyl)Ethyl Carbamate*

Following the procedure of Example 6 but omitting Step B, 2-methyl-2-(phenylsulfonyl)ethyl carbamate is obtained.

In a similar manner by following the procedure of Example 6 but substituting the sodium salt of: p-trifluoromethylbenzenesulfinate (prepared by reacting the sodium salt of p-trifluoromethylbenzene sulfonic acid with chlorosulfonic acid in chloroform solution and then reacting the resultant sulfonyl chloride with an alkaline solution of sodium sulfite), o-toluenesulfinate, p-methoxybenzenesulfinate, and o,p-xylenesulfinate, respectively, for the sodium benzenesulfinate in Step A of the example, the following products are obtained respectively: 2-methyl-2-(p-trifluoromethylphenylsulfonyl)amyl carbamate, 2-methyl-2-(o-tolylsulfonyl)amyl carbamate, 2-methyl-2-(p-methoxyphenylsulfonyl)amyl carbamate, and 2-methyl-2-(o,p-dimethylphenylsulfonyl)amyl carbamate. Furthermore, if Step B is omitted, these starting materials yield: 2-methyl-2-(p-trifluoromethylphenylsulfonyl)ethyl carbamate, 2-methyl - 2 - (o-tolylsulfonyl)ethyl carbamate, 2-methyl-2-(p-methoxyphenylsulfonyl)ethyl carbamate and 2-methyl - 2 - (o,p-dimethylphenylsulfonyl)ethyl carbamate, respectively.

EXAMPLE 8

*2,2-Dichloro-2-(Phenylsulfonyl)Ethanol, Ester With 1-Piperidinecarboxylic Acid*

Following the procedure of Example 4 but substituting 45 g. of piperidine for the ammonia, 2,2-dichloro-2-(phenylsulfonyl) ethanol, ester with 1-piperidinecarboxylic acid is obtained.

Similarly, by substituting any other basic saturated 5 to 6 membered N-heterocyclic of less than twelve carbon atoms for the piperidine in Example 8, the corresponding N-heterocyclic derivative is formed.

The invention may be variously otherwise embodied within the scope of the appended claims.

What is claimed is:

1. A compound of the formula

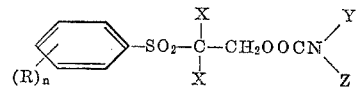

wherein R is selected from the group consisting of hydrogen, lower alkyl, lower alkoxy, halogen and trifluoromethyl, $n$ is a positive integer less than four, each X is selected from the group consisting of hydrogen, halogen and lower alkyl, provided if one X is halogen, the other X is also halogen, Y and Z are each selected from the group consisting of hydrogen and lower alkyl and together with the nitrogen to which they are joined Y and Z are a basic saturated 5 to 6 membered N-heterocyclic radical of less than twelve carbon atoms.

2. 2-(phenylsulfonyl)ethyl carbamate.

3. 2,2-dichloro-2-(phenylsulfonyl)ethyl carbamate.

4. 2,2 - dichloro - 2 - (p-chlorophenylsulfonyl)ethyl carbamate.

5. 2 - methyl - 2 - (phenylsulfonyl)amyl carbamte.

6. A process for preparing a compound of claim 1, which comprises interacting the corresponding alcohol of the formula

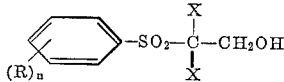

wherein R, $n$ and Z are as defined in claim 1, with phosgene and a compound of the formula:

wherein Y and Z are as defined in claim.

No references cited.